United States Patent

[11] 3,699,295

[72] Inventor Irvin P. Bielefeldt
   Rockford, Ill.
[21] Appl. No. 51,612
[22] Filed July 1, 1970
[45] Patented Sept. 28, 1971
[73] Assignee Alco Standard Corporation
   Valley Forge, Pa.

[54] HEATING APPARATUS WITH WORKPIECE CARRIERS
   12 Claims, 13 Drawing Figs.

[52] U.S. Cl. .................................................. 219/388,
   13/31, 219/405
[51] Int. Cl. .................................................. F27b 9/06
[50] Field of Search .......................................... 219/388,
   385, 394, 399, 405; 13/20, 31

[56] References Cited
   UNITED STATES PATENTS
   1,252,813  1/1918  Kochendorfer .............. 219/388

| | | | |
|---|---|---|---|
| 1,868,856 | 7/1932 | Sylvester ...................... | 219/388 |
| 2,841,684 | 7/1958 | Miskella ....................... | 219/385 X |
| 3,192,645 | 7/1965 | Oetjen et al. .................. | 219/388 X |

FOREIGN PATENTS
565,104  8/1944  Great Britain ............... 219/388

Primary Examiner—Volodymyr Y. Mayewsky
Attorney—Wolfe, Hubbard, Leydig, Voit & Osann Ltd.

ABSTRACT: Workpieces advanced into and heated radiantly within a series of end-to-end chambers are supported by movable carriers with reflective shielding packs which concentrate the radiant heat on the workpieces to promote rapid and uniform heating of the workpieces. In one embodiment, auxiliary heating elements are supported on the carriers themselves and are energized differentially as the carriers are advanced into the different chambers.

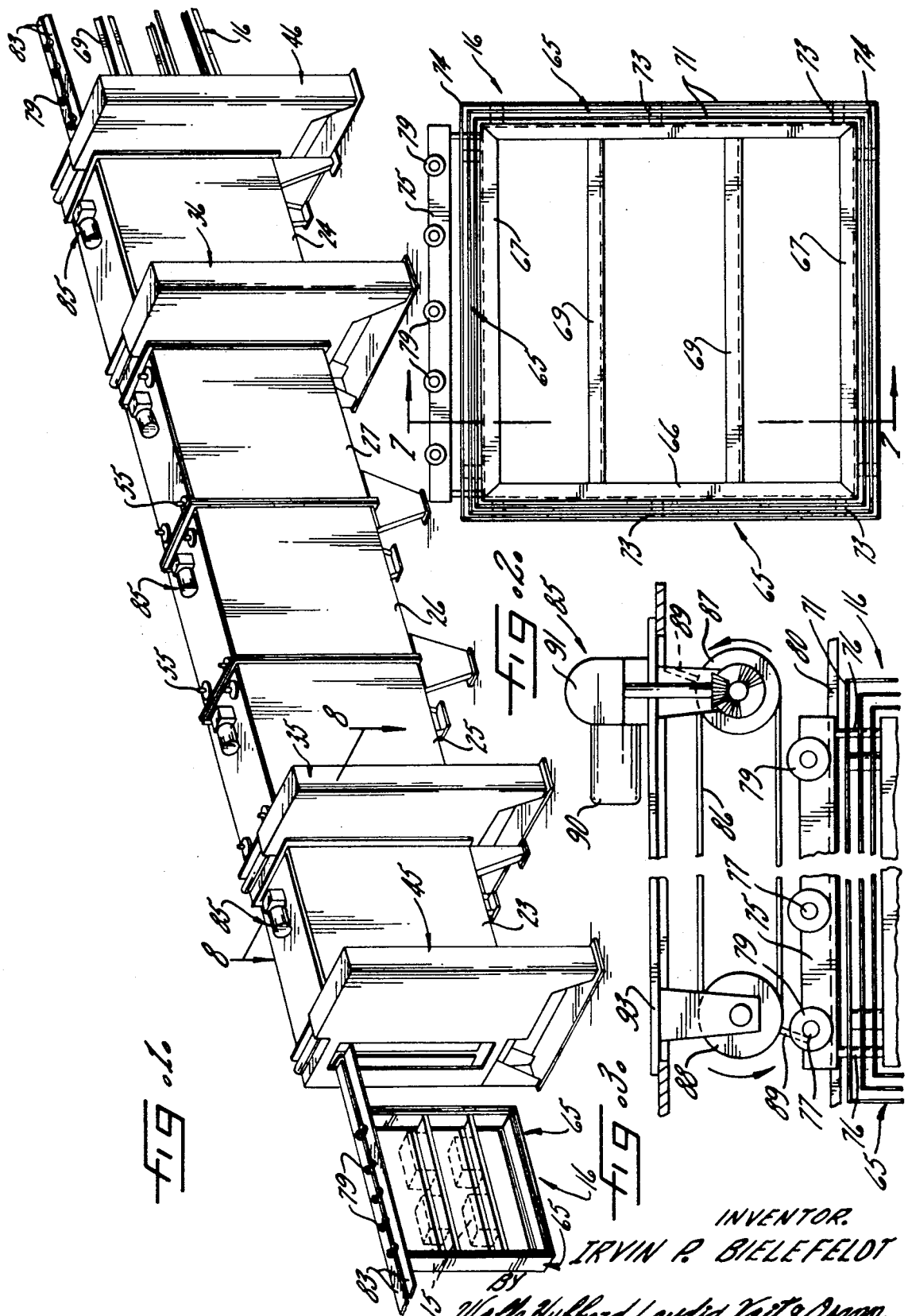

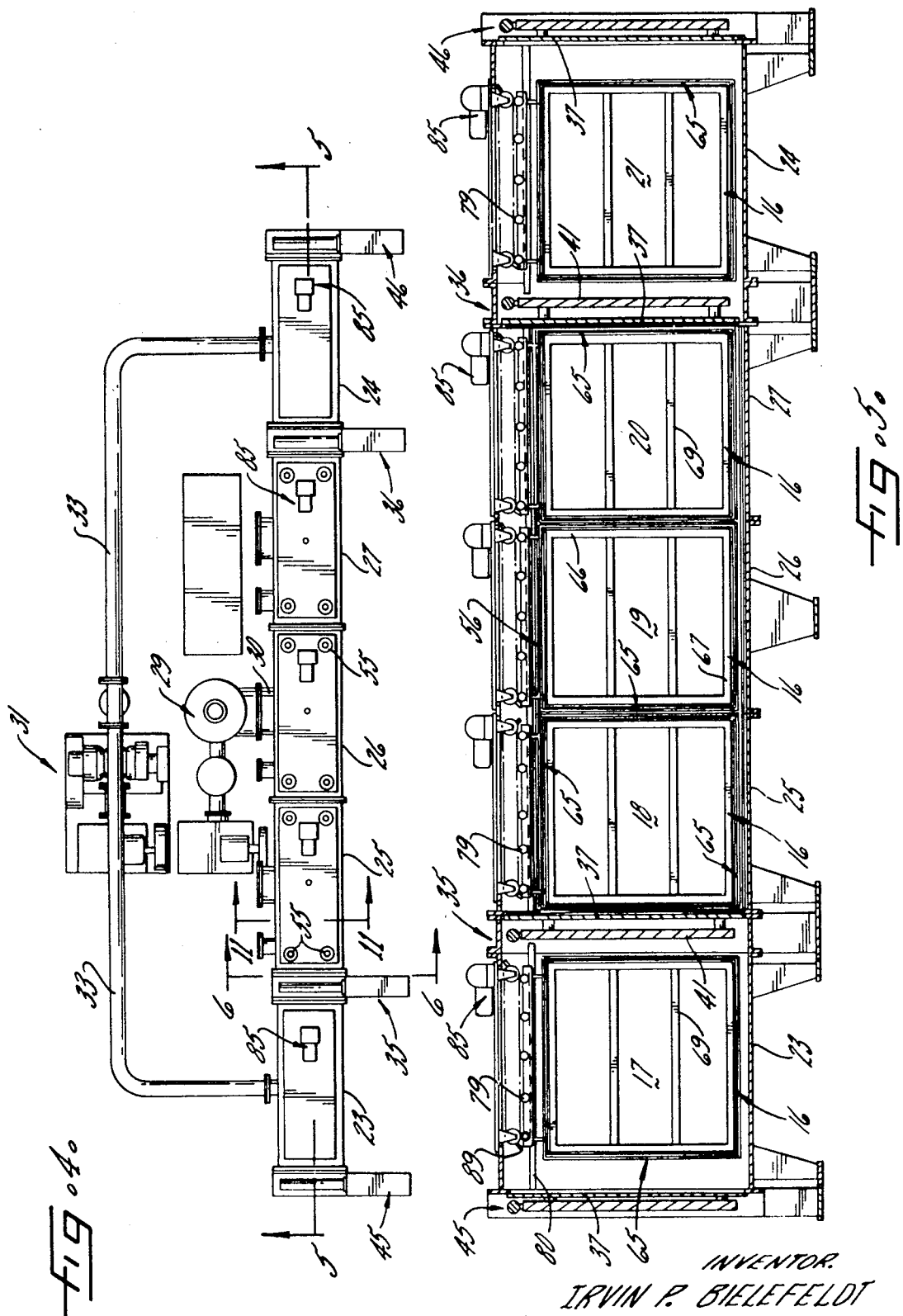

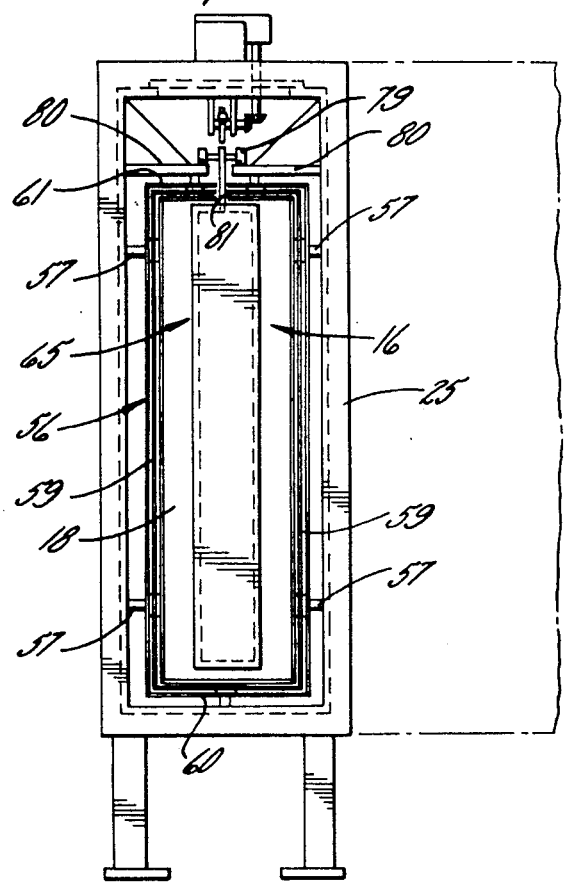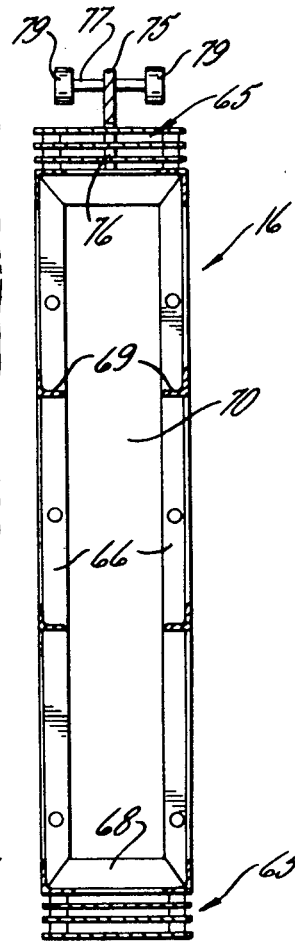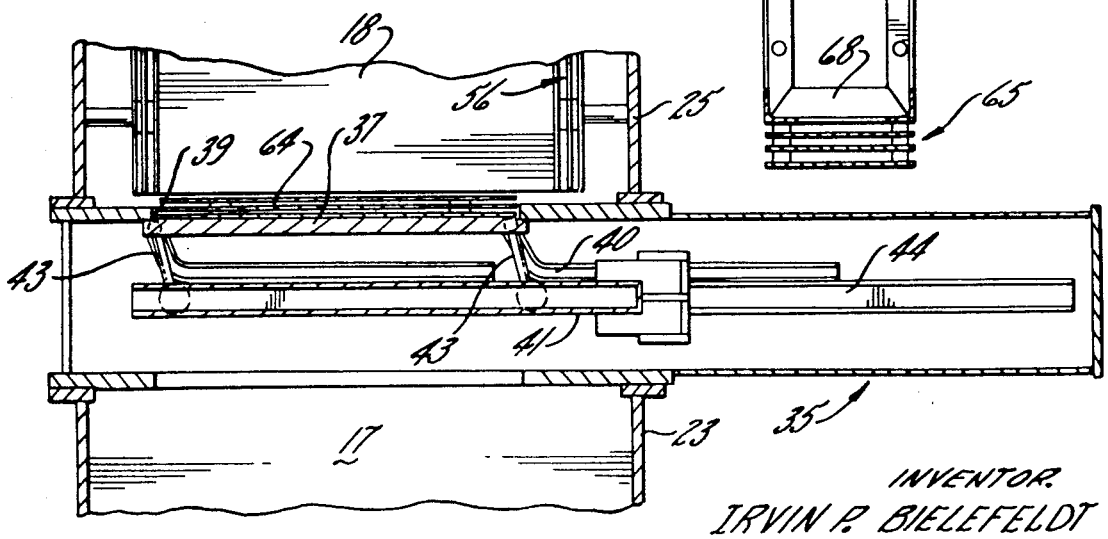

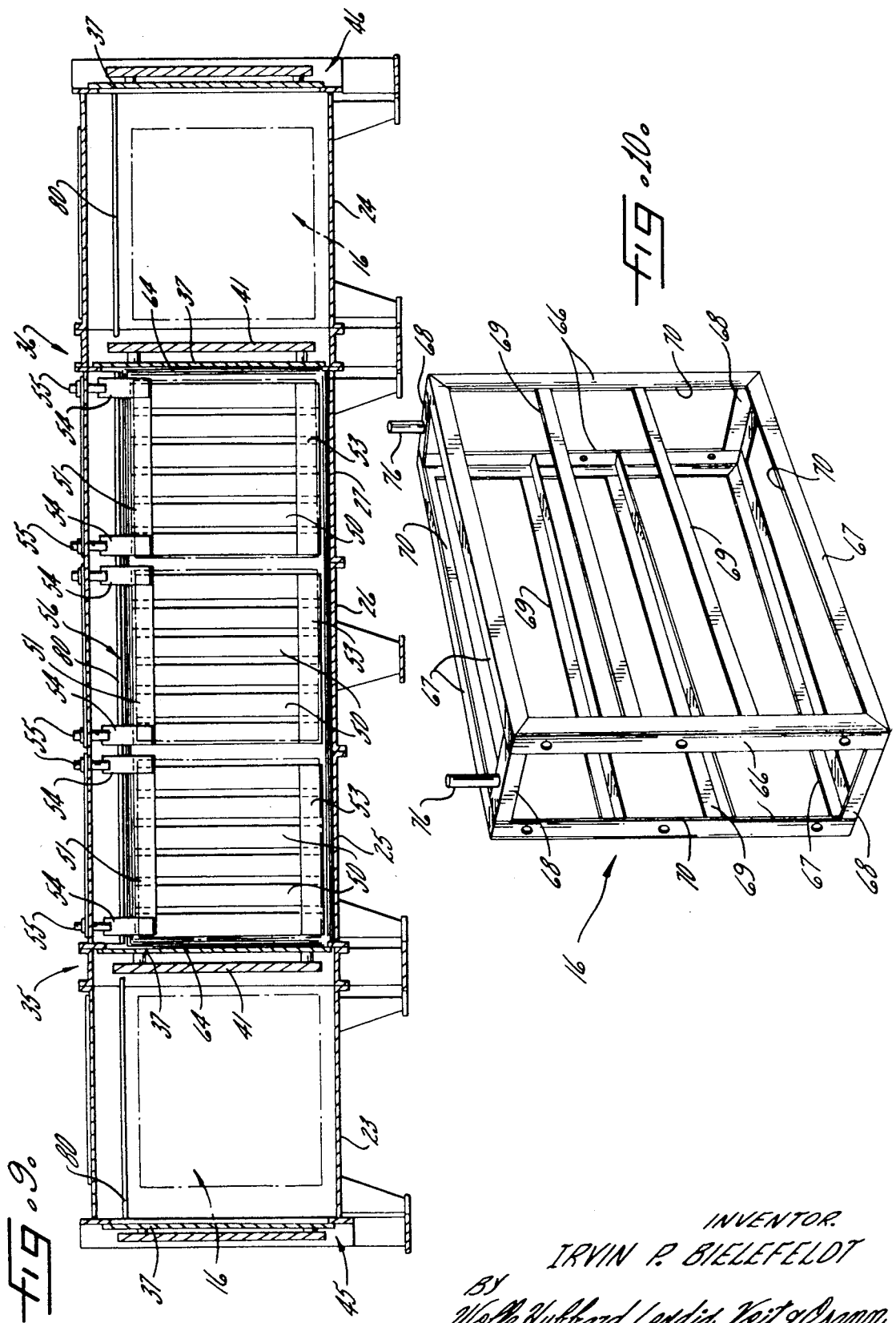

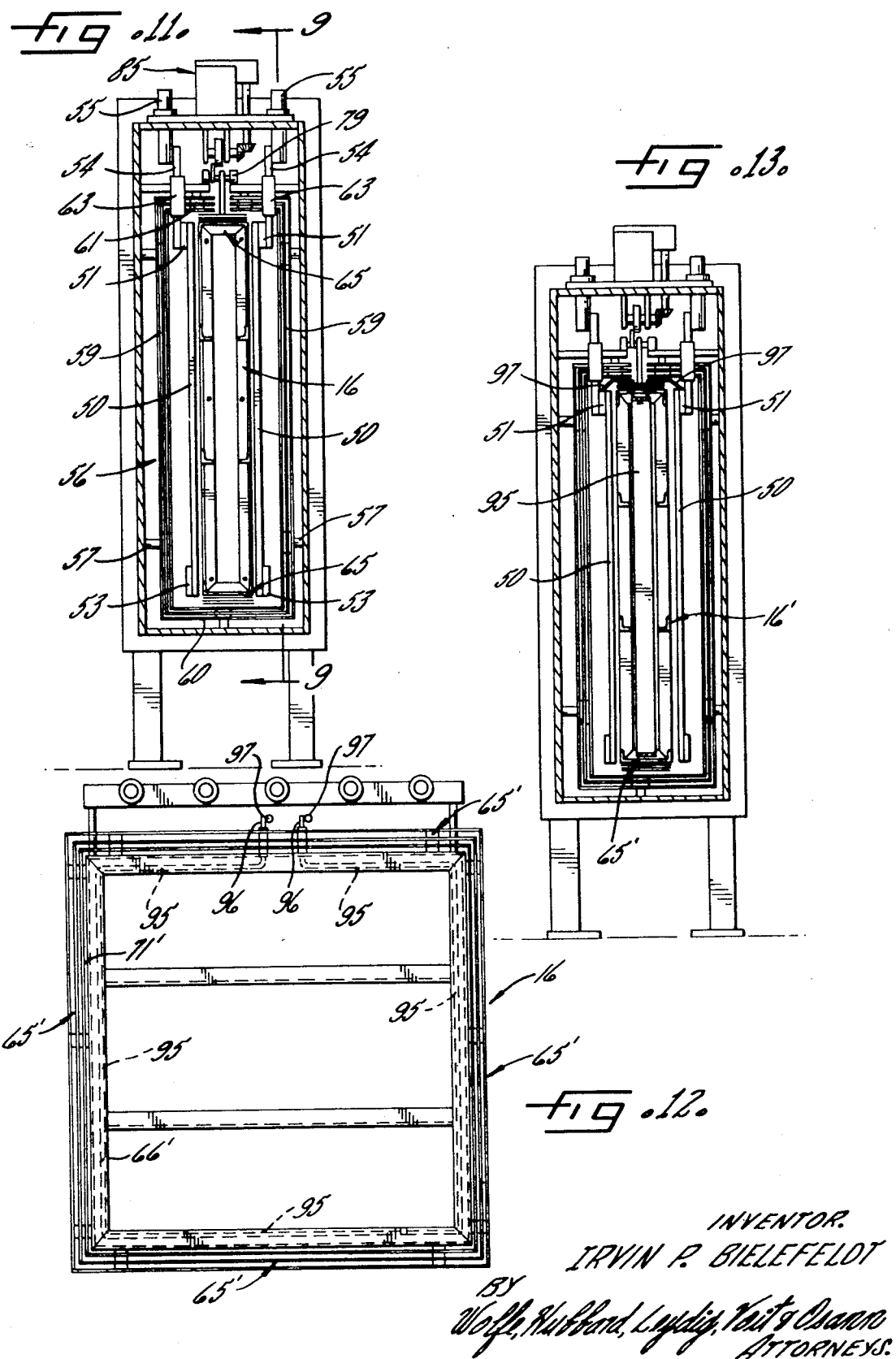

HEATING APPARATUS WITH WORKPIECE CARRIERS

BACKGROUND OF THE INVENTION

This invention relates generally to apparatus for heating workpieces and, more particularly, to apparatus of the type which includes a walled chamber defining a plurality of end-to-end heating zones into which the workpieces are advanced and heated. In apparatus of this type, batches of workpieces may be loaded into each of the zones and heated concurrently to the same established temperature in the individual zones prior to being cooled and unloaded. Alternatively, to reduce the overall time necessary for heating a given number of successive batches of workpieces to a given established temperature, the temperature of the workpieces may be progressively and gradually raised as the batches are sequentially advanced through adjacent zones which are heated differentially and maintained at increasingly higher temperatures. Apparatus of this general type is disclosed in Bornor U.S. Pat. application Ser. No. 839,253, filed July 7, 1969 and assigned to the assignee of the present invention.

In many instances, the workpieces are held in carriers which are advanced in end-to-end relation into the heating zones from one end of the chamber. Heating of the workpieces usually occurs within the zones in a vacuum to prevent oxidation of the workpieces and is effected radiantly by heaters disposed within the zones. Heat shielding is placed within the zones and also between adjacent zones to help confine the radiated heat on the workpieces and to reduce the heat loss through the walls of the chamber and between adjacent zones.

SUMMARY OF THE INVENTION

The general aim of the present invention is to provide new and improved heating apparatus of the above character which is of simpler and more trouble-free construction than prior apparatus of the same general type and which, at the same time, is capable of effecting more rapid and uniform heating of the workpieces to an established temperature and without need of energizing the heaters to a temperature significantly above the established temperature.

In large, the foregoing ends are achieved by the unique mounting of radiant heat shielding on the workpiece carriers themselves, the shielding forming a reflective and conductive enclosure around the workpieces on the carriers and concentrating the radiant heat on the workpieces to reduce temperature differentials normally occuring within each zone and to enable the workpieces to be heated faster and more evenly with a given heat output from the heaters. In addition, the shielding on the carriers establishes a heat barrier between adjacent zones to restrict the radiation of heat from one zone to another and to help maintain each zone at an established temperature. As a result of employing shielding on the carriers, doors with radiant shielding for establishing a heat barrier between adjacent zones can be eliminated to simplify the overall heating apparatus and to avoid the need of opening and closing such doors when the workpieces are advanced between zones.

The invention also resides in the novel construction of the carriers and the shielding, in the ease of inspecting and cleaning the shielding on the carriers and, in one embodiment of the invention, in the mounting of auxiliary heaters on the carriers themselves to effect even more rapid and uniform heating of the workpieces.

These and other objects and advantages of the invention will become apparent from the following detailed description taken in connection with the accompanying drawings.

BRIEF DESCRIPTION OF THE DRAWINGS

FIG. 1 is a fragmentary perspective view of new and improved heating apparatus embodying the novel features of the present invention.

FIG. 2 is a front elevation of one of the carriers for the workpieces.

FIG. 3 is a front elevation of part of a drive mechanism for advancing the carriers through the zones.

FIG. 4 is a plan view of the apparatus shown in FIG. 1.

FIGS. 5 and 6 are enlarged cross sections taken substantially along the lines 5—5 and 6—6, respectively, of FIG. 4.

FIG. 7 is an enlarged cross section taken substantially along the line 7—7 of FIG. 2.

FIG. 8 is an enlarged fragmentary cross section taken substantially along the line 8—8 of FIG. 1.

FIG. 9 is an enlarged cross section taken substantially along the line 9—9 of FIG. 11.

FIG. 10 is a fragmentary perspective view of one of the carriers with the shielding removed.

FIG. 11 is an enlarged cross section taken substantially along the line 11—11 of FIG. 4 and showing one of the carriers in a heating zone.

FIG. 12 is a view similar to FIG. 2 but showing a modified carrier with auxiliary heaters.

FIG. 13 is a view similar to FIG. 11 but showing the modified carrier in the heating zone.

DETAILED DESCRIPTION OF THE PREFERRED EMBODIMENTS

As shown in the drawings for purposes of illustration, the invention is embodied in a heating apparatus in which metal workpieces 15 (FIG. 1) are heated while in the presence of a vacuum to prevent oxides from forming on the surfaces of the workpieces during heating. The workpieces, for example, may comprise aluminum parts which are brazed together during the heating operation.

The workpieces 50 are held in carriers 16 which, in this particular instance, are adapted to be advanced into the apparatus one-by-one and in end-to-end relation, each carrier first being advanced into and stopped in a loading and preheating chamber 17 (FIG. 5) and then a main heating chamber defined by three end-to-end zones 18, 19 and 20. Each heating zone herein is maintained at a higher temperature than the preceding zone so that the temperature of the workpieces on each carrier is gradually increased as the carrier is transferred out of one zone and into the adjacent zone. Disposed end-to-end with the heating zone 20 is a cooling and unloading chamber 21 into which the carriers 16 are transferred after heating of the workpieces 15 in the zone 20 has been completed. Several carriers may be handled simultaneously, as shown in FIG. 5, with one carrier being located in each of the three heating zones while another carrier is in the loading chamber 17 and still another in the unloading chamber 21. It will be appreciated that a smaller or greater number of heating zones may be employed and that, in place of the described semicontinuous operation, a batch operation may be used wherein the workpieces on the several carriers simply are loaded into the heating zones at the same time, heated to the same prescribed temperature while in the zones, and then cooled and simultaneously unloaded. Alternatively, each heating zone may be maintained at the same prescribed temperature and the carriers advanced cyclically through the zones in accordance with optimum processing procedures to obtain temperature uniformity within the workpieces.

The loading and unloading chambers 17 and 21 are defined within gastight vessels 23 and 24 (FIGS. 1 and 4) of rectangular cross section disposed at opposite ends of a series of three interconnected rectangular enclosures or vessels 25, 26 and 27 which define the main heating zones 18, 19 and 20. A high vacuum pump 29 (FIG. 4) communicates with the heating vessels 25, 26 and 27 through a pipe 30 while a medium vacuum pump 31 communicates with the loading and unloading vessels through pipes 33.

In order to maintain a high order of vacuum at all times in the heating zones 18, 19 and 20, the loading and unloading chambers 17 and 21 are adapted to be sealed from the heating zones during the intervals when the loading and unloading chambers are open to enable carriers 16 to be advanced into the loading chamber and removed from the unloading chamber. For this purpose, a gastight door module 35 (FIGS. 1 and 8) is connected between the loading vessel 23 and the heating vessel 25 while a similar door module 36 is connected between the unloading vessel 24 and the heating vessel 27, each module containing a vacuum door 37 (FIG. 8) for sealing a rectangular passageway 39 connecting between the heating zone and the adjacent chamber. Each door is guided for horizontal sliding by a track 40 within the module and is adapted to be moved between positions opening and closing the passageway 39 by a hydraulic actuator (not shown) which is operable to reciprocate a yoke 41 connected to the door by links 43 and guided by a track 44. Reference may be had to the aforementioned Bornor application for a more detailed description of the construction of the door modules 35 and 36 and of the operation of the doors 37.

Door modules 45 and 46 (FIGS. 1 and 4) basically similar to the modules 35 and 36 are connected to the outboard ends of the loading and unloading vessels 23 and 24, respectively, to enable the vessels to be first opened for the purposes of loading and unloading the carriers 16 and then closed to prevent the outside atmosphere from entering the heating zones 18, 19 and 20 when the doors 37 of the modules 35 and 36 are opened to permit the transfer of carriers into the heating zone 18 and out of the heating zone 20. Thus, while the door 37 of the module 35 is sealed, the door of the end module 45 is opened to enable the transfer of a carrier into the loading chamber 17. Then, after the door of the end module 45 has been closed and the vacuum redrawn in the loading chamber, the door of the module 35 is opened to enable the carrier to be advanced from the loading chamber and into the heating zone 18 without any air entering the heating zone. Similarly, the door 37 of the module 36 is opened to enable transfer of a carrier from the heating zone 20 to the unloading chamber 21 while the latter is in an evacuated condition and while the door of the end module 46 is sealed. After the door of the module 36 has been reclosed, a coolant may be circulated through coils (not shown) in the unloading chamber to cool the workpieces 15 on the carrier before the door of the end module 46 is opened to permit removal of the carrier from the unloading chamber.

Heating of the workpieces 15 in the heating zones 18, 19 and 20 is effected radiantly by electric heating bars 50 of the resistance type disposed within the zones. As shown most clearly in FIGS. 9 and 11, several vertically extending and horizontally spaced heating bars 50 are disposed adjacent each inner sidewall of each of the heating vessels 25, 26 and 27 and are connected together at their upper and lower ends by upper and lower horizontally extending bus bars 51 and 53, there being separate sets of bus bars for each of the three heating vessels. Each upper bus bar is suspended from the top of the respective vessel by conductive hangers 54 connected to electrical terminals 55 which, in turn, are adapted to be connected to a source of voltage. By means of transformers (not shown) a higher voltage is applied to the set of bus bars in the heating vessel 26 than to the bus bars in the vessel 25 and a still higher voltage is applied to the bus bars in the heating vessel 27 so that the heating bars within each of the three vessels are energized differentially and radiate with different intensities to maintain a predetermined temperature within the vessel 25, a higher temperature within the vessel 26 and a still higher temperature in the vessel 27. Alternatively, the zones may be maintained at different temperatures by applying the same voltage to all of the bus bars and by using heating bars with different electrical resistances in the different zones. For a typical process such as the brazing of aluminum workpieces, the heating zone 18 within the vessel 25 may be maintained at 800° F., the heating zone 19 at 1,000° F. and the heating zone 20 at 1,150° F. If desired, steam may be circulated through heating coils (not shown) in the loading vessel 23 to preheat the workpieces to a temperature of, for example, 400° F. before the workpieces are advanced into the main heating zones.

To confine the heat radiated by the heating bars 50 within the heating zones 18, 19 and 20, reflective shielding packs 56 (FIGS. 6 and 11) are located within each of the heating vessels 25, 26 and 27. Herein, each of the shielding packs comprises a series of side-by-side sheets of reflective heat-resistant material suitably joined together in spaced apart relation and separated from one another and from the vessels by spacers 57. The sheets are arranged within each vessel to define a shielding enclosure of rectangular cross section with an open passage or tunnel permitting movement of the workpieces 15 and carriers 16 through the vessel. Thus, each shielding pack includes upright side sections 59 disposed between the heating bars and the sidewalls of the respective vessel, a bottom section 60 closely adjacent the bottom of the vessel, and a top section 61 which is apertured to accommodate the hangers 54. Bushings 63 (FIG. 11) are telescoped over the hangers 54 and electrically insulate the latter from the shielding packs. The shielding packs establish a heat barrier limiting heating of the walls of the vessels and, in addition, serve to reflect the heat radiated from the heating bars back onto the workpieces. Preferably, shielding packs 64 (FIGS. 8 and 9) are fastened to the inboard sides of the doors 37 of the modules 35 and 36 to protect the doors from the high intensity heat within the heating zones 18 and 20.

According to the primary aspect of the present invention, more uniform and rapid heating of the workpieces 15 is achieved than has been possible with prior apparatus of the same general character by constructing the workpiece carriers 16 in a novel manner and by uniquely utilizing the carriers to concentrate the heat radiated in each of the zones 18, 19 and 20 on the workpieces on the carriers. For these purposes, heat shields 65 (FIG. 2) are mounted on the carriers themselves and form an enclosure around the workpieces to confine the radiated heat to the workpieces and to reduce temperature differentials within each heating zone. As a result, with the heating bars 50 energized to a given temperature, more of the radiated heat is focused on the workpieces to effect faster and more even heating of the workpieces. Moreover, the heat shields 65 on the carriers block the radiation of heat from one heating zone to another and thereby enable simplification of the heating apparatus by eliminating the need of establishing heat barriers between adjacent heating zones with shielded doors which must be opened and closed when the workpieces are transferred.

More particularly, each carrier 16 comprises an open rectangular frame formed by upright leading and trailing angle bars 66 (FIG. 10), by upper and lower longitudinally extending angle bars 67 and by cross bars 68 all made of a heat resistant and reflective material such as Inconel or other nickel-iron alloy. The workpieces 15 may be supported in the carriers in various selected ways and herein rest on intermediate longitudinally extending bars 69 spanning the upright bars 66. As shown most clearly in FIG. 10, the various bars define leading and trailing and upper and lower openings 70 in the corresponding sides of the carrier. Such openings are covered by the heat shields 65 (FIG. 2) which herein comprise packs of vertically disposed and side-by-side sheets 71 made of heat resistant and reflective material such as thin Inconel foil and spaced apart by bushings 73. The shielding packs 65 are secured to the outer sides of the frame bars with the inner sheet of each pack exposed to the workpieces 15 through an adjacent opening 70 and with the outer sheets of the various packs facing forwardly, rearwardly, upwardly, and downwardly. The ends of each pack are mitered and butted together as indicated at 74 in FIG. 2 and thus the packs define a polygonal enclosure around the leading and trailing and upper and lower ends of the workpieces while leaving the laterally facing sides of the workpieces exposed to the heating bars 50.

As shown most clearly in FIGS. 3 and 7, a narrow bar 75 is fastened to each carrier by hangers 76 projecting downwardly through the top shielding pack 65 and connected to the upper cross bars 68. Spaced along the bar is a series of horizontally projecting axles 77 whose opposite ends journal small rollers 79. As the carriers are advanced, the rollers ride along a track member formed by horizontal flanges 80 (FIG. 6) projecting inwardly from the sides of the vessels 23 to 27 and extending through the vessels adjacent the upper ends thereof, the flanges being interrupted in the areas of the door modules 35 and 36. To accommodate the bars 75 and the hangers 76 during advancement of the carriers 16, the adjacent edges of the flanges 80 are spaced apart and, in addition, the top sections 61 of the shielding packs 56 within the vessels 25 to 27 are slotted as indicated at 81 in FIG. 6. Additional flanges 83 (FIG. 1) supported on posts (not shown) extend outwardly from the loading and unloading vessels 23 and 24 to support the carriers before and after treating of the workpieces 15.

To advance the carriers 16 through the vessels 23 to 27, a drive mechanism 85 (FIG. 3) is located adjacent the upper end of each vessel. In this instance, each drive mechanism comprises an endless chain 86 trained around sprockets 87 and 88 and carrying a pair of spaced dogs 89 located to sequentially engage different ones of the axles 77 on the carriers as the chain is driven by a motor 90 which acts through gearing 91 to turn the sprocket 87. The sprockets, the gearing and the motor are supported on a plate 93 with the sprockets located inside of the vessel and the motor located above the vessel. Each time one of the motors is energized, one of the dogs on the associated chain advances the carrier until the latter is picked up by one of the dogs on the chain in the succeeding vessel.

With the foregoing arrangement, the carriers 16 are advanced in end-to-end relation into the heating zones 17, 18 and 19 and are located in the zones as shown in FIG. 5 with the trailing shielding pack 65 of the leading carriers closely adjacent the leading shielding pack of the following carriers. During heating, the heat radiated by the heating bars 50 in each zone is reflected off of the four shielding packs 65 of each carrier and is concentrated and focused on the workpieces 15 within the enclosure defined by the packs. The leading and trailing packs 65 of each carrier restrict the radiation of heat out of the ends of the zone while the top pack 65 on the carrier shields the slot 81 in the upper side 61 of the stationary packs 56 and restricts heat losses through the slot. The heat radiated against the edges of the packs 65 is conducted edgewise through the sheets 71 and thus the latter, in effect, become extensions of the heating bars 50 to provide radiantly glowing surfaces closely adjacent the leading and trailing and upper and lower ends of the workpieces similar to the glowing surfaces provided by the heating bars 50 adjacent the laterally facing sides of the workpieces. Accordingly, the heat within the enclosure formed by the shielding packs 65 is intensified and temperature differentials from front to rear and top to bottom within the enclosure are reduced so that the workpieces are heated substantially uniformly and are heated rapidly to the selected temperature without need of raising the temperature of the heating bars 50 significantly above the selected temperature.

By virtue of the leading and trailing shielding packs 65 on each carrier 16, there is no need of incorporating shielding doors between the heating zones 18 and 19 and the zones 19 and 20 as is the case with most prior apparatus with multiple heating zones. That is, the leading and trailing packs 65, in effect, take the place of shielding doors and restrict the radiation of heat out of the adjacent ends of the zones to confine the heat to the workpieces while assisting in maintaining each zone at its selected temperature. Without doors between the zones, the complexity of the apparatus is reduced and the transfer of the workpieces between zones is simplified.

Because the shielding packs 65 are mounted on the carriers 16, the packs may be inspected easily and cleaned when necessary simply by dipping the entire carrier into an acid bath. Also, differently shaped carriers with differently shaped shielding packs may be used to hold workpieces of special shapes and may be employed in the same vessels 23 to 27 to concentrate the heat uniformly on the workpieces.

A modified carrier 16' is shown in FIGS. 12 and 13 and is capable of causing even more rapid and uniform heating of the workpieces. In this instance, electric resistance heating elements 95 (FIG. 12) are disposed within the carrier itself and coact with the heating bars 50 to heat the workpieces 15. The heating elements extend alongside the inner sheets 71' of each of the shielding packs 65' and are suitably connected to and insulated from the angle bars 66' to 68'. Conductors 96 connected to the heating elements 95 extend upwardly through the top shield pack 65' and include contacts 97 which ride along the upper bus bars 51 as the carriers are advanced (see FIG. 13). The heating elements 95 thus are heated to different temperatures as the carriers are advanced into different ones of the zones 18 to 20 and assist the heating bars 50 in raising the temperature of the workpieces.

I claim as my invention:

1. In apparatus for heating workpieces, the combination of, a walled chamber defining a plurality of zones disposed end-to-end and adapted to communicate with one another, radiant heaters disposed along opposite upright sidewalls of said chamber for heating at least one of said zones, carriers for supporting the workpieces to be heated and adapted to be advanced into said zones from one end of said chamber, means in said chamber for supporting a row of said carriers within said zones, each of said carriers having leading and trailing and upper and lower walls extending around the workpieces and defining a polygonal enclosure whose axis extends transversely of said heaters and whose sides face the heaters, and said carrier walls being formed at least in part by heat reflective shielding facing the workpieces for concentrating the heat radiated by said heaters within said enclosure to promote uniform and rapid heating of the workpieces.

2. Apparatus as defined in claim 1 in which said shielding comprises packs of spaced apart and side-by-side sheets of heat resistant reflective material.

3. Apparatus as defined in claim 2 in which each of said carriers comprises a frame defining leading and trailing openings and upper and lower openings, said shielding packs being attached to said frame and covering said openings with the inner face of the inner reflective sheet of each pack facing the workpieces.

4. Apparatus as defined in claim 1 further including heat reflective side shields disposed between said heaters and the sidewalls of said chamber to reflect the heat from said heaters into the sides of said enclosure to heat the workpieces therein.

5. Apparatus as defined in claim 1 further including heat reflective side shields disposed between said heaters and the sidewalls of said chamber, and a heat reflective top shield fixed within said chamber above said carriers.

6. Apparatus as defined in claim 5 in which said supporting means comprise an elongated member disposed within said chamber above said top shield, means on each carrier projecting upwardly through an elongated slot in said top shield and movable along said member, and said shielding on the upper walls of said carriers underlying said slot to block the upward radiation of heat therethrough.

7. Apparatus as defined in claim 1 further including electric resistance heating elements disposed within said enclosure on the inner sides of said shielding, electric buses extending along said chamber parallel to the path of advance of said carriers, and means on said carriers connected electrically to said heating elements and located to contact said buses as said carriers are advanced thereby to energize said heating elements by way of said buses.

8. In apparatus for heating workpieces, the combination of, a walled chamber defining a heating zone, radiant heaters disposed along opposite walls of said chamber for heating said zone, a carrier for supporting the workpieces to be heated and adapted to be advanced into said zone from one end of said chamber, means in said chamber for supporting said carrier within said zone during heating of the workpieces, said carrier having walls extending around the workpieces and defining an enclosure whose axis extends transversely of said heaters and of the direction of advance of the carrier, and said carrier walls being formed at least in part by heat shielding exposed to the workpieces for concentrating the heat radiated by said heaters within said enclosure to promote uniform and rapid heating of the workpieces.

9. In apparatus for heating workpieces, the combination of, a walled chamber defining a plurality of heating zones disposed end-to-end with adjacent zones communicating with one another through a passage of predetermined size and shape, means for establishing a negative pressure within said zones, radiant heaters selectively operable to heat each of said zones to a different predetermined temperature, carriers for holding the workpieces to be heated, means operable to support and advance a row of said carriers along a predetermined path through said zones in end-to-end relation and to stop the carriers periodically in said zones whereby different ones of said carriers may be positioned simultaneously in different zones and the workpieces thereon heated to different temperatures, heat shields mounted on the leading and trailing ends of said carriers and correlated in size and shape with the size and shape of the passage between adjacent zones to establish a heat barrier restricting the radiation of heat between the zones and thereby facilitate the maintenance of each zone at substantially its selected predetermined temperature, said shields being made of heat resistant reflective material and being exposed to the workpieces to concentrate the heat radiated by said heaters on the workpieces thereby to promote rapid and uniform heating of the workpieces.

10. Apparatus as defined in claim 9 in which the passage between adjacent zones is of generally rectangular cross section, said shields also being generally rectangular and being of slightly lesser dimensions than the passage so as to be movable through the latter while blocking the radiation of heat through the major area of the passage.

11. Apparatus as defined in claim 9 further including reflective shields on the upper and lower sides of said carriers and coacting with said leading and trailing shields to define a polygonal enclosure around the workpieces on the carrier.

12. Apparatus as defined in claim 9 further including electric resistance heating elements disposed within said enclosure on the inner sides of shields, electric buses extending through each zone and parallel to said path with the buses in each zone being energizable with a different magnitude of voltage than the buses in the adjacent zone, and means on said carriers connected electrically to said heating elements and located to contact said buses as said carriers are advanced thereby to energize said heating elements by way of said buses and to different temperatures in different ones of said zones.